United States Patent [19]

Germain

[11] Patent Number: 5,423,186
[45] Date of Patent: Jun. 13, 1995

[54] PROCESS AND DEVICE FOR FREEZING SUBSTANCES CONTAINED IN RECEPTACLES

[75] Inventor: Jean-Pierre Germain, Montigny-les-Bretonneux, France

[73] Assignee: L'Air Liquide, Societe Anonyme Pour L'Etude et L'Exploitation des Procedes Georges Claude, Paris, France

[21] Appl. No.: 183,323

[22] Filed: Jan. 19, 1994

[30] Foreign Application Priority Data

Feb. 10, 1993 [FR] France ............... 9301471

[51] Int. Cl.⁶ .................. F25D 3/11; F25D 17/02; F25D 25/04
[52] U.S. Cl. ........................... 62/63; 62/64; 62/374; 62/380
[58] Field of Search ........... 62/62, 63, 64, 60, 68, 62/373, 374, 380, 378; 198/752, 771

[56] References Cited

U.S. PATENT DOCUMENTS

| | | |
|---|---|---|
| 1,939,334 | 12/1933 | Burke . |
| 2,597,223 | 5/1952 | Burgess ................. 62/60 X |
| 3,082,097 | 3/1963 | Haller .................. 62/68 X |
| 3,228,206 | 1/1966 | Lockerby . |
| 3,498,070 | 3/1970 | Allen et al. ........... 62/380 X |
| 3,611,745 | 10/1971 | Schlemmer . |
| 3,875,754 | 4/1975 | Faust et al. ........... 62/60 |
| 3,889,488 | 6/1975 | Maeda et al. ......... 62/374 X |
| 4,351,158 | 9/1982 | Hurwitz et al. ....... 62/60 |
| 4,689,963 | 9/1987 | Sakai ................... 62/64 |
| 4,748,816 | 6/1988 | Arfert et al. .......... 62/63 |
| 5,156,008 | 10/1992 | Olsson et al. ......... 62/63 |
| 5,191,773 | 3/1993 | Cassell ................. 62/373 |
| 5,299,426 | 4/1994 | Lermuzeaux .......... 62/63 |

FOREIGN PATENT DOCUMENTS 0115242 8/1984 European Pat. Off. .
2674320 9/1992 France .

*Primary Examiner*—Christopher Kilner
*Attorney, Agent, or Firm*—Young & Thompson

[57] ABSTRACT

Process and device for freezing substances contained in a receptacle, in which the receptacle (4) is placed on a support (7) and is moved along the support in a path. The support is a conveyor, preferably a vibratory conveyor, and is maintained partially immersed in a liquefied gas (13). The level of the liquefied gas (13) does not exceed the height of the substance in the receptacle (4). The vibratory conveyor comprises a vibrating trough (1) having two opposed walls (9) defining between them a guide channel (3) for the receptacles (4) and, on opposite sides, a chamber (10) for distribution of liquefied gas. A device (11) provides liquefied gas to each chamber (10). The bottom (7) of the vibrating trough (1) is of embossed sheet metal.

6 Claims, 1 Drawing Sheet

PROCESS AND DEVICE FOR FREEZING SUBSTANCES CONTAINED IN RECEPTACLES

FIELD OF THE INVENTION

The present invention relates to processes and devices for freezing substances contained in receptacles, particularly in the pharmaceutical, veterinary or cosmetic industries.

BACKGROUND OF THE INVENTION

In these industries, there exists the need to freeze, for ultimate transportation and storage, fragile or unstable products, particularly solutions of active products that can settle out, just after their proportioning and packaging in bottles. At present, just after packaging, the bottle is manually placed in a cryogenic bath, typically of alcohol with carbon dioxide ice, then pre-closed. These known processes are delicate to practice and do not lead to very rapid cooling.

SUMMARY OF THE INVENTION

The present invention has for its object to provide a process and device permitting very rapid freezing of the substances contained in receptacles and rapid mass production to permit improved automation.

To do this, according to a characteristic of the invention, the process comprises the steps of placing the receptacle on a support and moving, along a path, the receptacle on its support, partially maintained immersed in a liquefied gas.

According to other characteristics of the invention:
the receptacle is moved on a vibrating surface constituting the support and is covered with liquefied gas, whose level preferably does not rise above that of the substance in the receptacle.

The present invention also has for its object to provide a device for practicing this process and characterized in that it comprises a conveyor support moving the receptacles along a path and means to maintain a level of liquefied gas on the support along a path.

Preferably, the conveyor support is a vibrating trough which preferably comprises two confronting walls defining between them a guide channel for the receptacles, and on opposite sides of this channel, a chamber for distribution of liquefied gas.

The document FR-A-2.674.320, in the name of the applicant, describes a freezing tunnel for bulk products, typically food products, poured into a vibratory trough.

BRIEF DESCRIPTION OF THE DRAWINGS

Other characteristics and advantages of the present invention will become apparent from the following description of one embodiment, given by way of illustrative example but in no way limiting, with respect to the attached drawings, in which.

DETAILED DESCRIPTION OF THE INVENTION

Figure 1:
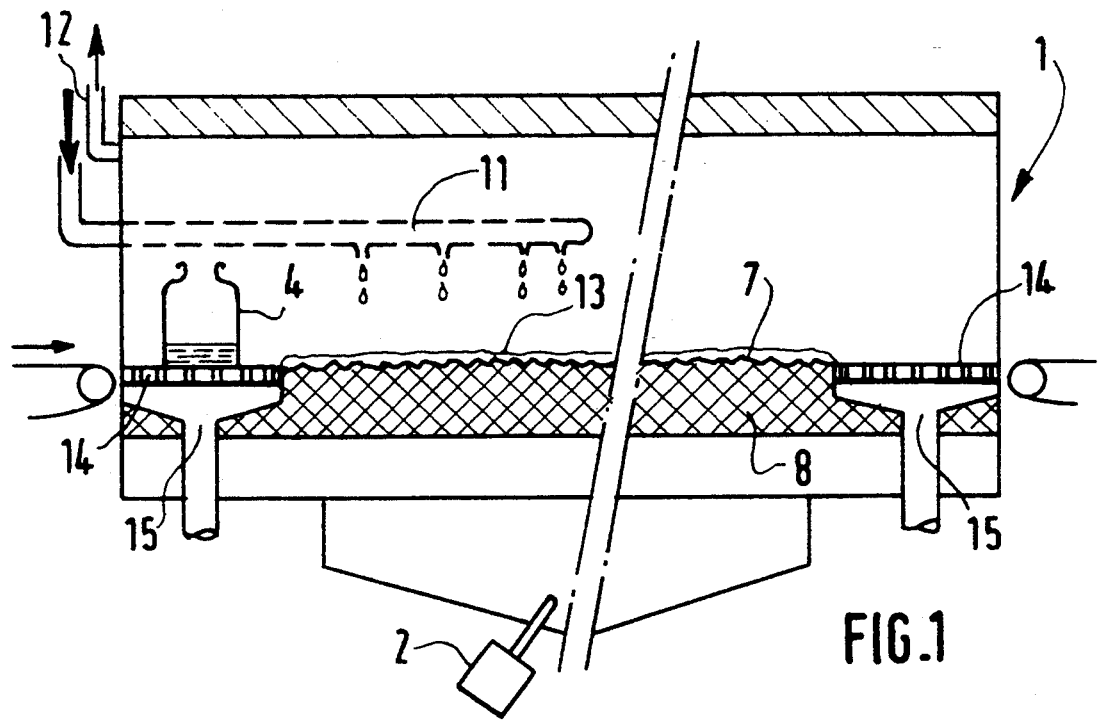
FIG. 1 is a schematic view in longitudinal cross section of a freezing device according to the invention.
Figure 2:
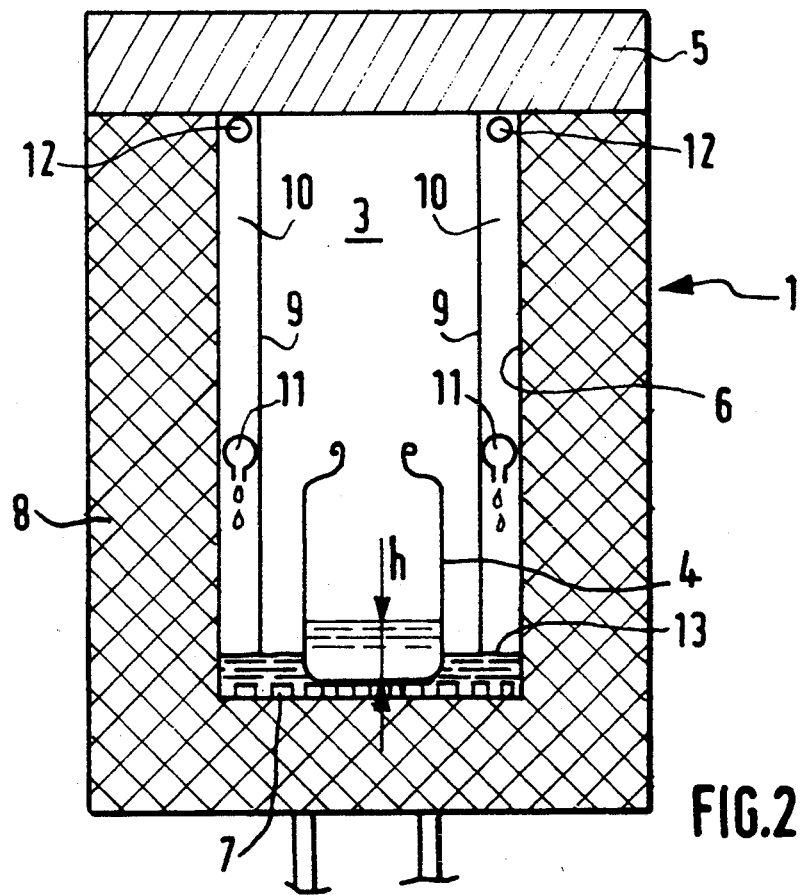
FIG. 2 is a schematic view in transverse cross section of the device of FIG. 1.

In the figures, there is shown a freezing device comprising, preferably within an isothermal cover (not shown), a vibrating structure 1, actuated by a vibratory device 2 and comprising a principal portion in the shape of a U-shaped trough defining internally a path 3 for bottles 4 leaving a packaging station at which an unstable or fragile mixture of products is poured into the container.

The vibratory trough 1, closed at its upper end by a cover 5, comprises an internal surface 6 which is of U shape, forming a bottom 7 for the channel 3 and delimiting internally an insulating mass 8. In the channel 3 are disposed in confronting relationship two parallel plates 9 laterally bounding the path for the receptacles 4 and defining, with the internal vertical surfaces 6, two vertical chambers 10 in which are disposed conduits 11 for pouring liquefied gas and conduits 12 for evacuation of vaporized gas during pouring of the liquefied gas. The walls 9 extend downwardly to the vicinity of the bottom wall 7 and are not hermetically connected to this latter so as to provide liquid passages between the interior channel 3 and the chambers 10 to maintain in the channel 3 a constant level of liquefied gas 13 not exceeding the height h of the substance in the receptacle 4. Preferably, the bottom wall 7 is constituted of ribbed or embossed sheet metal, typically of stainless steel, as described in a U.S. patent application filed this same day by the applicant under the title "Freezing Device with Vibrating Trough", and assigned Ser. No. 08/183,323.

As will be seen in FIG. 1, the floors for the entry and exit stations upstream and downstream of the vibrating trough 7 are formed by perforated walls 14 above devices 15 for the recovery and recycling of the liquid gas flowing to the ends of the trough 7. A filled receptacle 4, brought to the inlet station, advances under the effect of the low-frequency vibrations imparted to the structure 1, along the channel, in continuous contact with the film of liquefied gas, typically liquid nitrogen, to the exit station at which the cooled receptacle is closed and then gathered for transportation and storage, for example in a crystallizer.

By way of example, for a small pharmaceutical bottle, the temperature of the substance in the bottle is lowered to $-110°$ C. after travel along the channel for 60 seconds, the temperature reaching $-50°$ C. after a time along the path of only 30 seconds. In these two cases, the thickness of the liquefied gas layer on the vibrating support is 5 mm. It will be noted, by comparison, that when positioning the same bottle in a liquefied gas bath 5 mm deep, the temperature reaches only $-12°$ C. at the end of 50 seconds.

Although the present invention has been described in relation to a particular embodiment, it is not thereby limited but is on the contrary susceptible of modifications and variations which will be apparent to one skilled in the art. In particular, instead of being rectilinear, as shown in the drawings, the path of conveyance of the receptacles could be curvilinear, namely circular.

What is claimed is:

1. Device for freezing substances contained in a receptacle, comprising: a conveyor support having a vibrating trough for moving the receptacle along a path, said vibrating trough comprising two opposed walls defining between them a guide channel for the receptacle and, on each of two opposite sides of the guide channel, a chamber for distribution of liquefied gas, and means for maintaining a level of said liquefied gas on the support along the path, said level being sufficient to maintain the receptacle partially immersed in the liquefied gas.

2. Device according to claim 1, further comprising means for supplying liquefied gas to each said chamber.

3. The device of claim 1, wherein said vibrating trough has a bottom made of an at least partially ribbed or embossed sheet metal.

4. The device of claim 2, wherein the means for supplying liquefied gas comprises at least one liquid pouring conduit extending into each said chamber.

5. The device of claim 1, further comprising a gas extracting means in fluid flow communication with each said chamber.

6. The device of claim 1, comprising at least one end station in the path at one end of the conveyor support, the end station including a perforated floor.

* * * * *